(12) United States Patent
Hunt

(10) Patent No.: US 6,466,357 B2
(45) Date of Patent: Oct. 15, 2002

(54) PIXEL BASED GOBO RECORD CONTROL FORMAT

(75) Inventor: Mark Hunt, Derby (GB)

(73) Assignee: Light and Sound Design, Ltd., Birmingham (GB)

( * ) Notice: Subject to any disclaimer, the term of this patent is extended or adjusted under 35 U.S.C. 154(b) by 0 days.

(21) Appl. No.: 09/882,755

(22) Filed: Jun. 15, 2001

(65) Prior Publication Data

US 2001/0050800 A1 Dec. 13, 2001

Related U.S. Application Data

(63) Continuation of application No. 09/500,393, filed on Feb. 8, 2000, now Pat. No. 6,256,136, which is a continuation of application No. 09/145,314, filed on Aug. 31, 1998, now Pat. No. 6,057,958.
(60) Provisional application No. 60/065,133, filed on Nov. 12, 1997, and provisional application No. 60/059,161, filed on Sep. 17, 1997.

(51) Int. Cl.[7] .......................... G02B 26/00; G06K 9/00; H04N 1/46
(52) U.S. Cl. .................. 359/291; 382/181; 382/203; 382/228; 358/537; 358/540; 345/418; 345/431; 348/26
(58) Field of Search .......................... 359/291; 345/127, 345/418, 431; 382/162, 181, 190, 192, 194, 195, 197, 198, 199, 200, 203; 348/110, 26, 27; 358/537, 538, 540

(56) References Cited

U.S. PATENT DOCUMENTS

| 5,828,485 | A | | 10/1998 | Hewlett | 359/291 |
|---|---|---|---|---|---|
| 5,852,443 | A | | 12/1998 | Kenworthy | 345/431 |
| 5,878,413 | A | * | 3/1999 | Agrawal et al. | 382/181 |
| 5,995,660 | A | * | 11/1999 | Andoh et al. | 382/181 |
| 6,091,852 | A | * | 7/2000 | Entleitner et al. | 382/181 |
| 6,185,330 | B1 | * | 2/2001 | Hirao | 382/181 |
| 6,256,136 | B1 | * | 7/2001 | Hunt | 359/291 |
| 6,272,241 | B1 | * | 8/2001 | Tattersall | 382/181 |
| 6,285,783 | B1 | * | 9/2001 | Isomura et al. | 382/181 |
| 6,317,517 | B1 | * | 11/2001 | Lu | 382/228 |

* cited by examiner

Primary Examiner—Loha Ben
(74) Attorney, Agent, or Firm—Fish & Richardson P.C.

(57) ABSTRACT

A special record format used for commanding light pattern shapes and addressable light pattern shape generator. The command format includes a first part which commands a specified gobo and second parts which command the characteristics of that gobo. The gobo is formed by making a default gobo based on the type and modifying that default gobo to fit the characteristics.

34 Claims, 6 Drawing Sheets

PIXEL BASED GOBO RECORD CONTROL FORMAT

This application is a continuation of U.S. application Ser. No. 09/500,393, filed Feb. 8, 2000, now U.S. Pat. No. 6,256,136, which is a continuation of U.S. application Ser. No. 09/145,314, filed Aug. 31, 1998, now U.S. Pat. No. 6,057,958, which claims priority from U.S. Provisional application Nos. 60/059,161, filed Sep. 17, 1997, and 60/065,133, filed Nov. 12, 1997.

FIELD

The present invention relates to a system of controlling light beam pattern ("gobo") shape in a pixilated gobo control system.

BACKGROUND

Commonly assigned patent application Ser. No. 08/854,353, now U.S. Pat. No. 6,188,933, the disclosure of which is herewith incorporated by reference, describes a stage lighting system which operates based on computer-provided commands to form special effects. One of those effects is control of the shape of a light pattern that is transmitted by the device. This control is carried out on a pixel-by-pixel basis, hence referred to in this specification as pixilated. Control is also carried out using an x-y controllable device. The preferred embodiment describes using a digital mirror device, but other x-y controllable devices such as a grating light valve, are also contemplated.

The computer controlled system includes a digital signal processor 106 which is used to create an image command. That image command controls the pixels of the x-y controllable device to shape the light that it is output from the device.

The system described in the above-referenced application allows unparalleled flexibility in selection of gobo shapes and movement. This opens an entirely new science of controlling gobos. The present inventors found that, unexpectedly, even more flexibility is obtained by a special control language for controlling those movements.

SUMMARY

The present disclosure defines a way of communicating with an x-y controllable device to form special electronic light pattern shapes. More specifically, the present application describes using a control language to communicate with an electronic gobo in order to reposition part or all of the image that is shaping the light.

BRIEF DESCRIPTION OF THE DRAWINGS

These and other aspects of the invention will now be described with reference to the attached drawings, in which.

DESCRIPTION OF THE PREFERRED EMBODIMENT

Figure 1:
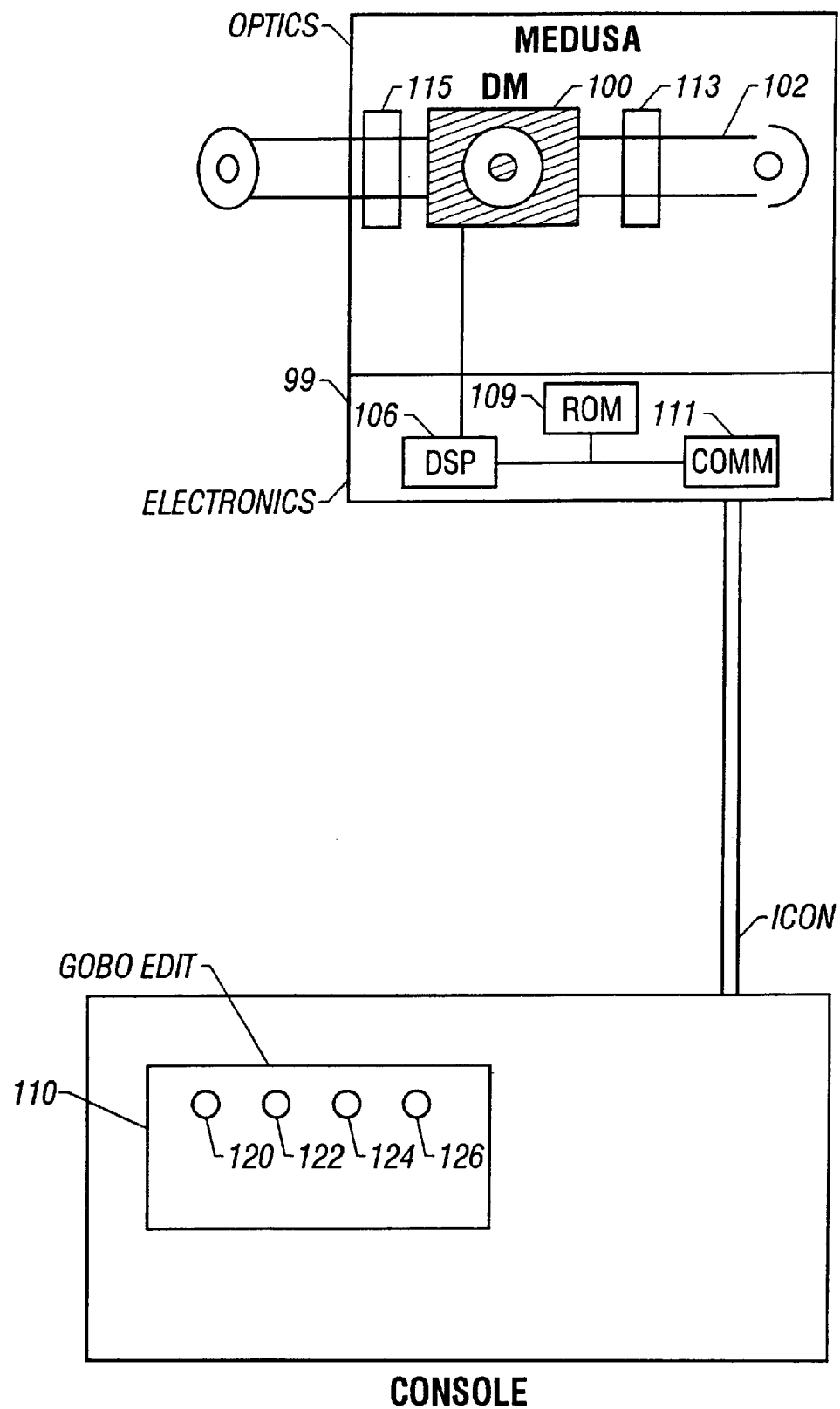
FIG. 1 shows a block diagram of the basic system operating the embodiment.

FIG. 1 shows a block diagram of the hardware used according to the preferred embodiment. As described above, this system uses a digital mirror device 100, which has also been called a digital mirror device ("DMD") and a digital light processor device ("DLP"). More generally, any system which allows controlling shape of light on a pixel basis, including a grating light valve, could be used as the light shaper. This light shaper forms the shape of light which is transmitted. FIG. 1 shows the light being transmitted as 102, and shows the transmitted light. The information for the digital mirror 100 is calculated by a digital signal processor 106. Information is calculated based on local information stored in the lamp, e.g., in ROM 109, and also in information which is received from the console 104 over the communication link.

The operation is commanded according to a format. The preferred data format provides 4 bytes for each of color and gobo control information.

The most significant byte of gobo control data, ("dfGobo") indicates the gobo type. Many different gobo types are possible. Once a type is defined, the gobo formed from that type is represented by a number. That type can be edited using a special gobo editor described herein. The gobo editor allows the information to be modified in new ways, and forms new kinds of images and effects.

The images which are used to form the gobos may have variable and/or moving parts. The operator can control certain aspects of these parts from the console via the gobo control information. The type of gobo controls the gobo editor to allow certain parameters to be edited.

The examples given below are only exemplary of the types of gobo shapes that can be controlled, and the controls that are possible when using those gobo shapes. Of course, other controls of other shapes are possible and predictable based on this disclosure.

A first embodiment is the control of an annulus, or "ring" gobo. The DMD 100 in FIG. 1 is shown with the ring gobo being formed on the DMD. The ring gobo is type 000A. When the gobo type 0A is enabled, the gobo editor 110 on the console 104 is enabled and the existing gobo encoders 120, 122, 124, and 126 are used. The gobo editor 110 provides the operator with specialized control over the internal and the external diameters of the annulus, using separate controls in the gobo editor.

The gobo editor and control system also provides other capabilities, including the capability of timed moves between different edited parameters. For example, the ring forming the gobo could be controlled to be thicker. The operation could then effect a timed move between these "preset" ring thicknesses. Control like this cannot even be attempted with conventional fixtures.

Another embodiment is a composite gobo with moving parts. These parts can move though any path that are programmed in the gobo data itself. This is done in response to the variant fields in the gobo control record, again with timing. Multiple parts can be linked to a single control allowing almost unlimited effects.

Another embodiment of this system adapts the effect for an "eye" gobo, where the pupil of the eye changes its position (look left, look right) in response to the control.

Yet another example is a Polygon record which can be used for forming a triangle or some other polygonal shape.

The control can be likened to the slider control under a QuickTime movie window, which allows you to manually move to any point in the movie. However, our controls need not be restricted to timelines.

Even though such moving parts are used, scaling and rotation on the gobo is also possible.

The following type assignments are contemplated:
00-0F=FixedGobo (with no "moving parts")
10-1F=SingleCntrl (with 1 "moving part")
20-2F=DoubleCntrl (with 2 "moving parts")
30-FF=undefined, reserved.

The remaining control record bytes for each type are defined as follows:

| Byte: | dfGobo2 | dfGobo3 | dfGobo4 | #gobos/type, | total memory |
|---|---|---|---|---|---|
| FixedGobo: | ID[23:16] | ID[15:8] | ID[7:0] | 16M/type | 256M |
| SingleCntrl: | ID[15:8] | ID[7:0] | control#1 | 64k/type | 1M |
| DoubleCntrl: | ID[7:0] | control#2 | control#1 | 256/type | 4k |

As can be seen from this example, this use of the control record to carry control values does restrict the number of gobos which can be defined of that type, especially for the 2-control type.

Console Support

The use of variant part gobos requires no modifications to existing console software for the ICON (7M) console. The Gobo editor in current ICON software already provides 4 separate encoders for each gobo. These translate directly to the values of the 4 bytes sent in the communications data packet as follows:

| Byte: | dfGobo | dfGobo2 | dfGobo3 | dfGobo4 |
|---|---|---|---|---|
| Enc: | TopRight | MidRight | BotRight | BotLeft |
| FixedGobo: | | ID[23:16] | ID[15:8] | ID[7:0] |
| SingleCntrl: | | ID[15:8] | ID[7 0] | control#1 |
| DoubleCntrl: | | ID[7:0] | control#2 | control#1 |

These values would be part of a preset gobo, which could be copied as the starting point.

Once these values are set, the third and fourth channels automatically become the inner/outer radius controls. Using two radii allows the annulus to be turned "inside out".

Each control channel's data always has the same meaning within the console. The console treats these values as simply numbers that are passed on. The meanings of those numbers, as interpreted by the lamps change according to the value in dfGobo.

The lamp will always receives all 4 bytes of the gobo data in the same packet. Therefore, a "DoubleCntrl" gobo will always have the correct control values packed along with it.

Hence, the console needs no real modification. If a "soft" console is used, then name reassignments and/or key reassignments may be desirable.

Timing

For each data packet, there is an associated "Time" for gobo response. This is conventionally taken as the time allotted to place the new gobo in the light gate. This delay has been caused by motor timing. In this system, variant gobo, the control is more dynamically used. If the non-variant parts of the gobo remain the same, then it is still the same gobo, only with control changes. Then, the time value is interpreted as the time allowed for the control change.

Since different gobo presets (in the console) can reference the same gobo, but with different control settings, this allows easily programmed timed moves between different annuli, etc.

Internal Workings

When the gobo command data is extracted from the packet at the lamp, the dfGobo byte is inspected first, to see if either dfGobo3 or dfGobo4 are significant in selecting the image. In the case of the "Cntrl" variants, one or both of these bytes is masked out, and the resulting 32-bit number is used to search for a matching gobo image (by Gobo_1D) in the library stored in the lamp's ROM 109.

If a matching image is found, and the image is not already in use, then the following steps are taken:

1) The image data is copied into RAM, so that its fields may be modified by the control values. This step will be skipped if the image is currently active.
2) The initial control values are then recovered from the data packet, and used to modify certain fields of the image data, according to the control records.
3) The image is drawn on the display device, using the newly-modified fields in the image data.

If the image is already in use, then the RAM copy is not altered. Instead, a time-sliced task is set up to slew from the existing control values to those in the new data packet, in a time determined by the new data packet.

At each vertical retrace of the display, new control values are computed, and steps 2 (using the new control values) and 3 above are repeated, so that the image appears modified with time.

The Image Data Records

All images stored in the lamp are in a variant record format:

Header:

Length 32 bits, offset to next gobo in list.

Gobo _1D 32 bits, serial number of gobo.

Gobo records:

Length 32 bits, offset to next record.

Opcode 16 bits, type of object to be drawn.

Data Variant part—data describing object.

_Length 32 bits, offset to next record.

Opcode 16 bits, type of object to be drawn.

Data Variant part—data describing object.

_EndMarker 64 bits, all zeroes—indicates end of gobo data.

+Next gobo, or End Marker, indicating end of gobo list.

Gobos with controls are exactly the same, except that they contain control records, which describe how the control values are to affect the gobo data. Each control record contains the usual length and Opcode fields, and a field containing the control number (1 or 2).

These are followed by a list of "field modification-"records. Each record contains information about the offset (from the start of the gobo data) of the field, the size (8, 16 or 32 bits) of the field, and how its value depends on the control value.

| | |
|---|---|
| Length | 32 bits, offset to next record |
| Opcode | 16 bits = control_record (constant) |
| CntrlNum | 16 bits = 1 or 2 (control number) |
| | /* field modification record #1 */ |
| Address | 16 bits, offset from start of gobo to affected field. |
| Flags | 16 bits, information about field (size, signed, |

-continued

|  |  |
|---|---|
|  | etc) |
| Scale | 16 bits, scale factor applied to control before use |
| ZPoint | 16 bits, added to control value after scaling. |
|  | /* field modification record #2 */ |
| Address | 16 bits, offset from start of gobo to affected field. |
| Flags | 16 bits, information about field (size, signed, etc) |
| Scale | 16 bits, scale factor applied to control before use |
| ZPoint | 16 bits, added to control value after scaling. |

As can be seen, a single control can have almost unlimited effects on the gobo, since ANY values in the data can be modified in any way, and the number of field modification records is almost unlimited.

Note that since the control records are part of the gobo data itself, they can have intimate knowledge of the gobo structure. This makes the hard-coding of field offsets acceptable.

In cases where the power offered by this simple structure is not sufficient, a control record could be defined which contains code to be executed by the processor. This code would be passed parameters, such as the address of the gobo data, and the value of the control being adjusted.
Example records.

| The Annulus record has the following format: | |
|---|---|
| Length | 32 bits |
| Opcode | 16 bits, = type_annulus |
| Pad | 16 bits, unused |
| Centre_x | 16 bits, x coordinate of centre |
| Centre_y | 16 bits, y coordinate of centre |
| OuterRad | 16 bits, outside radius (the radii get swapped when drawn if their values are in the wrong order) |
| InnerRad | 16 bits, inside radius |

It can be seen from this that it is easy to "target" one of the radius parameters from a control record. Use of two control records, each with one of the radii as a target, would provide full control over the annulus shape.

Note that if the center point coordinates are modified, the annulus will move around the display area, independent of any other drawing elements in the same gobo's data.
The Polygon record for a triangle has this format:

| The Polygon record for a triangle has this format: | |
|---|---|
| Length | 32 bits |
| Opcode | 16 bits, = type_polygon |
| Pad | 16 bits, vertex count = 3 |
| Centre_x | 16 bits, x coordinate of vertex |
| Centre_y | 16 bits, y coordinate of vertex |
| Centre_x | 16 bits, x coordinate of vertex |
| Centre_y | 16 bits, y coordinate of vertex |
| Centre_x | 16 bits, x coordinate of vertex |
| Centre_y | 16 bits, y coordinate of vertex |

It is easy to modify any of the vertex coordinates, producing distortion of the triangle.

The gobo data can contain commands to modify the drawing environment, by rotation, scaling, offset, and color control, the power of the control records is limitless.

Second Embodiment

This second embodiment provides further detail about implementation once the gobo information is received.

Figure 2:
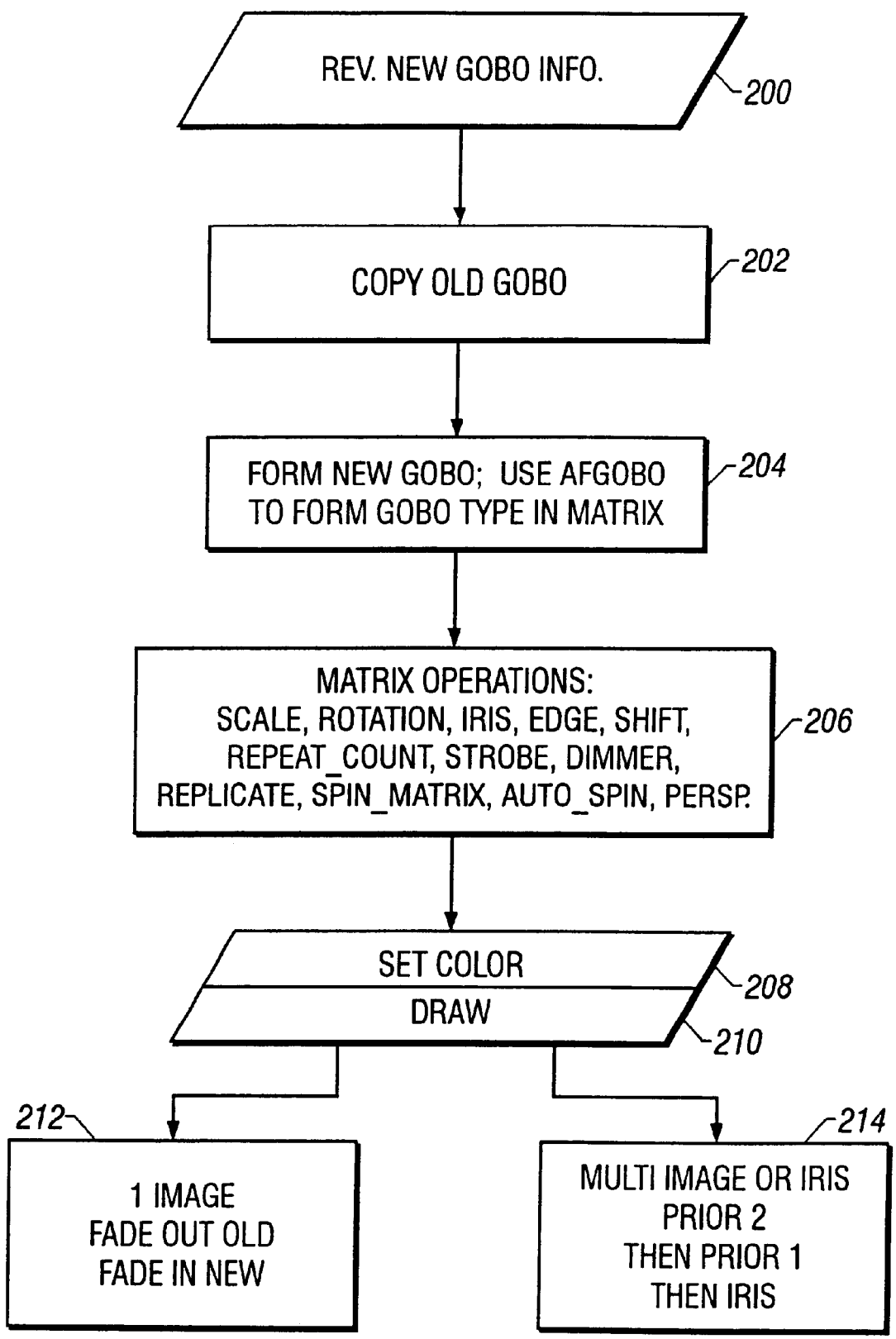
FIG. 2 shows a basic flowchart of operation.

Gobo information is, at times, being continuously calculated by DSP 106. The flowchart of FIG. 2 shows the handling operation that is carried out when new gobo information is received.

At step 200, the system receives new gobo information. In the preferred embodiment, this is done by using a communications device 111 in the lamp 99. The communications device is a mailbox which indicates when new mail is received. Hence, the new gobo information is received at step 200 by determining that new mail has been received.

At step 202, the system copies the old gobo and switches pointers. The operation continues using the old gobo until the draw routine is called later on.

At step 204, the new information is used to form a new gobo. The system uses a defined gobo ("dfGobo") as discussed previously which has a defined matrix. The type dfGobo is used to read the contents from the memory 109 and thereby form a default image. That default image is formed in a matrix. For example, in the case of an annulus, a default size annulus can be formed at position 0,0 in the matrix. An example of forming filled balls is provided herein.

Step 206 represents calls to subroutines. The default gobo is in the matrix, but the power of this system is its ability to very easily change the characteristics of that default gobo. In this embodiment, the characteristics are changed by changing the characteristics of the matrix and hence, shifting that default gobo in different ways. The matrix operations, which are described in further detail herein, include scaling the gobo, rotation, iris, edge, strobe, and dimmer. Other matrix operations are possible. Each of these matrix operations takes the default gobo, and does something to it.

For example, scale changes the size of the default gobo rotation rotates the default gobo by a certain amount. Iris simulates an iris operation by choosing an area of interest, typically circular, and erasing everything outside that area of interest. This is very easily done in the matrix, since it simply defines a portion in the matrix where all black is written.

Edge effects carry out certain effects on the edge such as softening the edge. This determines a predetermined thickness, which is translated to a predetermined number of pixels, and carries out a predetermined operation on the number of pixels. For example, for a 50% edge softening, every other pixel can be turned off. The strobe is in effect that allows all pixels to be turned on and off at a predetermined frequency, i.e., 3 to 10 times a second. The dimmer allows the image to be made dimmer by turning off some of the pixels at predetermined times.

The replicate command forms another default gobo, to allow two different gobos to be handled by the same record. This will be shown with reference to the exemplary third embodiment showing balls. Each of those gobos is then handled as the same unit and the entirety of the gobos can be, for example, rotated. The result of step 206 and all of these subroutines that are called is that the matrix includes information about the bits to be mapped to the digital mirror 100.

At step 208, the system then obtains the color of the gobos from the control record discussed previously. This gobo color is used to set the appropriate color changing circuitry 113 and 115 in the lamp 99. Note that the color changing circuitry is shown both before and after the digital mirror 100. It should be understood that either of those color changing circuits could be used by itself.

At step 210, the system calls the draw routine in which the matrix is mapped to the digital mirror. This is done in different ways depending on the number of images being used. Step 212 shows the draw routine for a single image being used as the gobo. In that case, the old gobo, now copied as shown in step 202, is faded out while the new gobo newly calculated is faded in. Pointers are again changed so that the system points to the new gobo. Hence, this has the effect of automatically fading out the old gobo and fading in the new gobo.

Step 214 schematically shows the draw routine for a system with multiple images for an iris. In that system, one of the gobos is given priority over the other. If one is brighter than the other, then that one is automatically given priority. The one with priority 2, the lower priority one, is written first. Then the higher priority gobo is written. Finally, the iris is written which is essentially drawing black around the edges of the screen defined by the iris. Note that unlike a conventional iris, this iris can take on many different shapes. The iris can take on not just a circular shape, but also an elliptical shape, a rectangular shape, or a polygonal shape. In addition, the iris can rotate when it is non-circular so that for the example of a square iris, the edges of the square can actually rotate.

Returning to step 206, in the case of a replicate, there are multiple gobos in the matrix. This allows the option of spinning the entire matrix, shown as spin matrix.

Figure 4A:
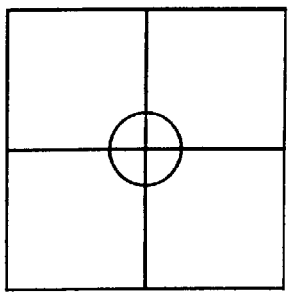
FIG. 4A through 4G show respective interim results of carrying out the replicating circles operation.

An example will now be described with reference to the case of repeating circles. At step 200, the new gobo information is received indicating a circle. This is followed by the other steps of 202 where the old gobo is copied, and 204 where the new gobo is formed. The specific operation forms a new gobo at step 300 by creating a circle of size diameter equals 1000 pixels at origin 00. This default circle is automatically created. FIG. 4A shows the default gobo which is created, a default size circle at 00. It is assumed for purposes of this operation that all of the circles will be the same size.

Figure 3:
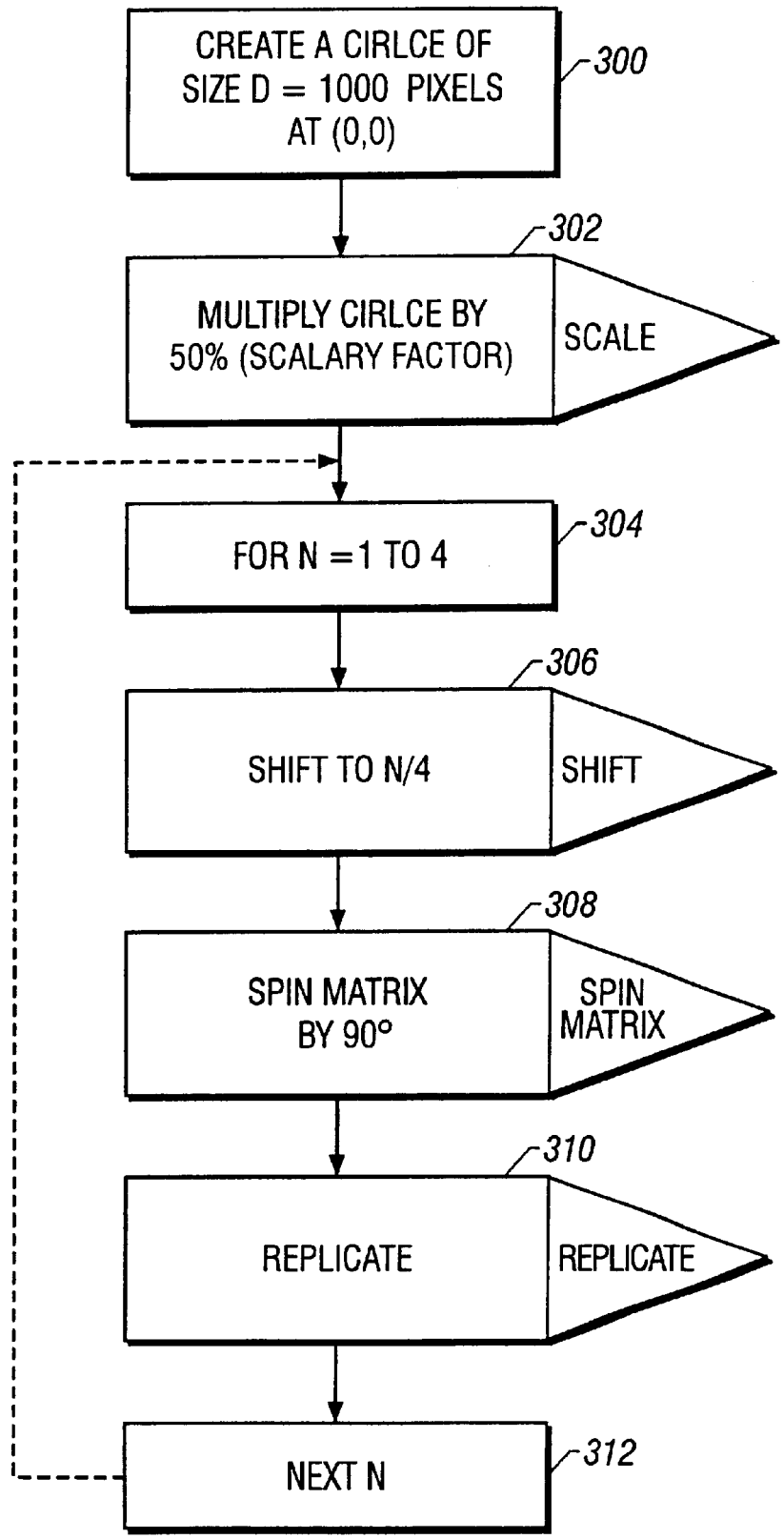
FIG. 3 shows a flowchart of forming a replicating circles type gobo.

At step 302, the circle is scaled by multiplying the entire circle by an appropriate scaling factor. Here, for simplicity, we are assuming a scaling factor of 50% to create a smaller circle. The result is shown in FIG. 4B. A gobo half the size of the gobo of FIG. 4A is still at the origin. This is actually the scale of the subroutine as shown in the right portion of step 302. Next, since there will be four repeated gobos in this example, a four-loop is formed to form each of the gobos at step 304. Each of the gobos is shifted in position by calling the matrix operator shift. In this example, the gobo is shifted to a quadrant to the upper right of the origin. This position is referred to as over 4 in the FIG. 3 flowchart and results in the gobo being shifted to the center portion of the top right quadrant as shown in FIG. 4C. This is again easily accomplished within the matrix by moving the appropriate values. At step 308, the matrix is spun by 90 degrees in order to put the gobo in the next quadrant as shown in FIG. 4D in preparation for the new gobo being formed into the same quadrant. Now the system is ready for the next gobo, thereby calling the replicate command which quite easily creates another default gobo circle and scales it. The four-loop is then continued at step 312.

Figure 4E:
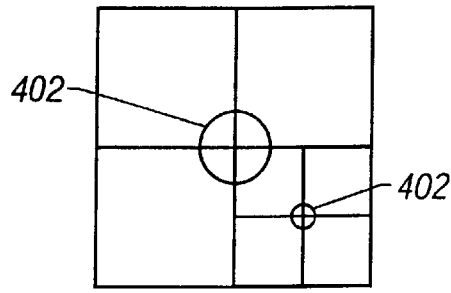
Figure 4B:
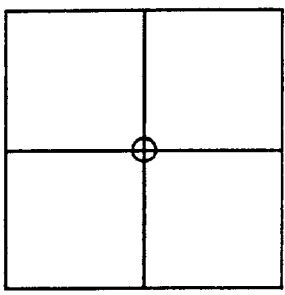
Figure 4F:
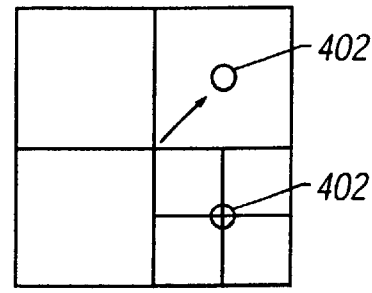
Figure 4C:
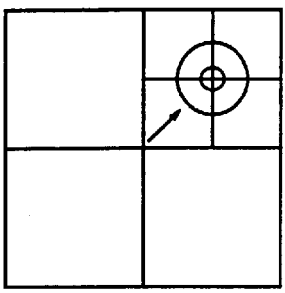
Figure 4G:
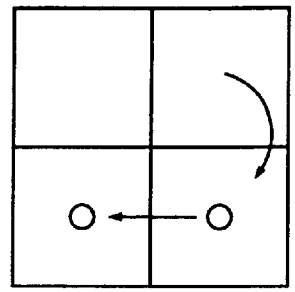
Figure 4D:
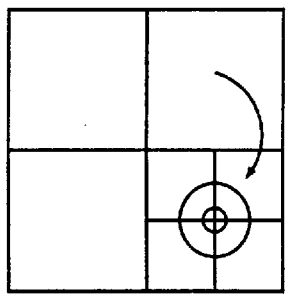

The replicate process is shown in FIG. 4E where a new gobo 402 is formed in addition to the existing gobo 400. The system then passes again through the four-loop, with the results being shown in the following figures. In FIG. 4F, the new gobo 402 is again moved to the upper right quadrant (step 306). In FIG. 4G, the matrix is again rotated to leave room for a new gobo in the upper right quadrant. This continues until the end of the four-loop. Hence, this allows each of the gobos to be formed.

Since all of this is done in matrix operation, it is easily programmable into the digital signal processor. While the above has given the example of a circle, it should be understood that this scaling and moving operation can be carried out for anything. The polygons, circles, annulus, and everything else is easily scaled.

The same operation can be carried out with the multiple parameter gobos. For example, for the case of a ring, the variable takes the form annulus (inner R, outer R, x and y). This defines the annulus and turns of the inner radius, the outer radius, and x and y offsets from the origin. Again, as shown in step 3, the annulus is first written into the matrix as a default size, and then appropriately scaled and shifted. In terms of the previously described control, the ring gobo has two controls: control 1 and control 2 defined the inner and outer radius.

Each of these operations is also automatically carried out by the command repeat count which allows easily forming the multiple position gobo of FIGS. 4A–4G. The variable auto spin defines a continuous spin operation. The spin operation commands the digital signal processor to continuously spin the entire matrix by a certain amount each time.

Figure 5:
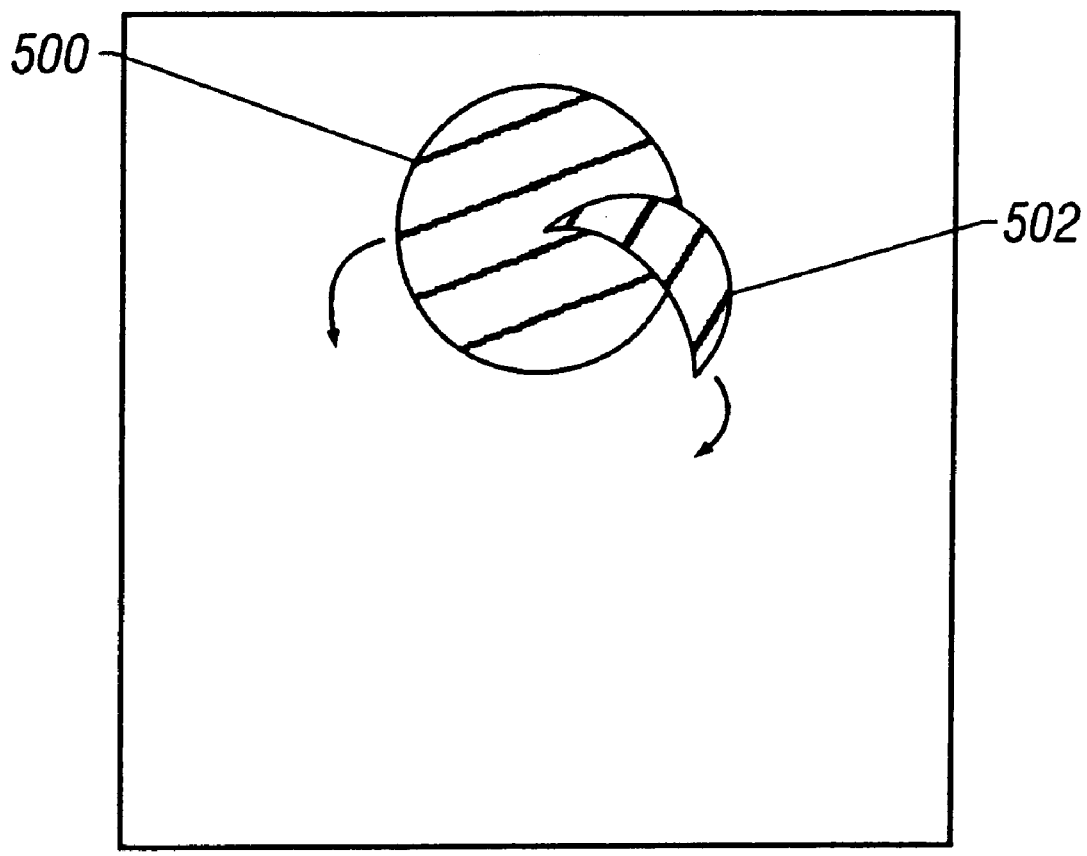
FIG. 5 shows the result of two overlapping gobos rotating in opposite directions.

One particularly interesting feature available from the digital mirror device is the ability to use multiple gobos which can operate totally separately from one another raises the ability to have different gobos spinning in different directions. When the gobos overlap, the processor can also calculate relative brightness of the two gobos. In addition, one gobo can be brighter than the other. This raises the possibility of a system such as shown in FIG. 5. Two gobos are shown spinning in opposite directions: the circle gobo 500 is spinning the counterclockwise direction, while the half moon gobo 502 is spinning in the clockwise direction. At the overlap, the half moon gobo which is brighter than the circle gobo, is visible over the circle gobo. Such effects were simply not possible with previous systems. Any matrix operation is possible, and only a few of those matrix operations have been described herein.

Figure 6:
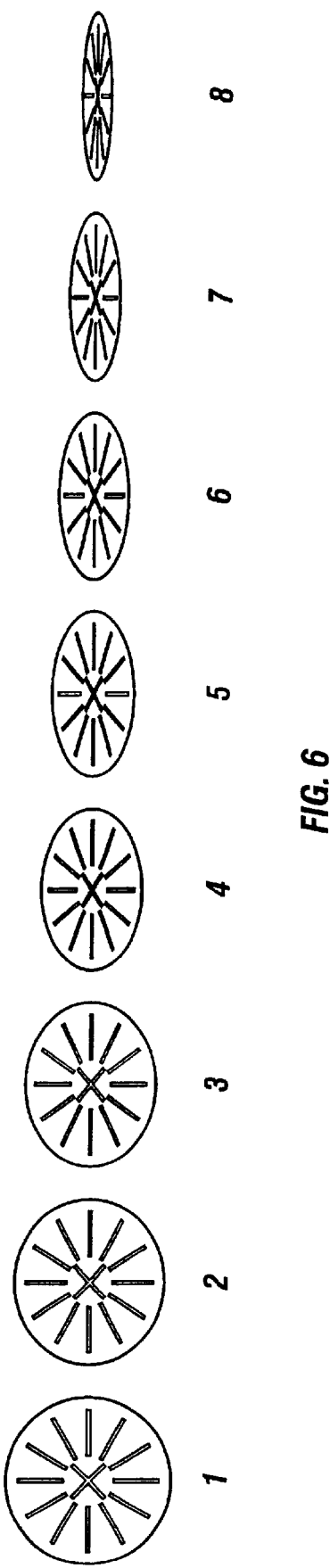
FIGS. 6(1) through 6(8) show a z-axis flipping gobo.

A final matrix operation to be described is the perspective transformation. This defines rotation of the gobo in the Z axis and hence allows adding depth and perspective to the gobo. For each gobo for which rotation is desired, a calculation is preferably made in advance as to what the gobo will look like during the Z axis transformation. For example, when the gobo is flipping in the Z axis, the top goes back and looks smaller while the front comes forward and looks larger. FIGS. 6(1)–(8) show the varying stages of the gobo flipping. In FIG. 6(8), the gobo has its edge toward the user. This is shown in FIG. 6(8) as a very thin line, e.g., three pixels wide, although the gobo could be zero thickness at this point. Automatic algorithms are available for such Z axis transformation, or alternatively a specific Z axis transformation can be drawn and digitized automatically to enable a custom look.

Although only a few embodiments have been described in detail above, other embodiments are contemplated by the inventor and are intended to be encompassed within the following claims. In addition, other modifications are contemplated and are also intended to be covered.

What is claimed is:

1. A lighting console, comprising:
   a plurality of control parts including a first control part that controls a gobo type and a second control part that controls characteristics of a gobo selected by the first control part,
   a processor, responsive to said first control part to enable different characteristics for said second control part based on the type of said first control part; and an output signal protection part, which produces a record indicating both said gobo type and said gobo characteristics.

2. A console as in claim 1, wherein said console provides an output of an alphanumeric code indicative of said gobo type and parameters for the specified gobo type.

3. A console as in claim 2, wherein said console includes a plurality of encoders, and said encoders are selectively enabled based on a selected gobo type.

4. A console as in claim 1, wherein a round gobo type can be selected, and one of said controllable characteristics is a diameter of said round gobo type.

5. A console as in claim 1, wherein an annular gobo type can be selected, and one of said controllable characteristics is a thickness of the annulus.

6. A console as in claim 1, further comprising enabling preset but different characteristics for a specified gobo.

7. A console as in claim 6, wherein one characteristic of said second control part is a timing of changing said gobo between said different characteristics.

8. A console as in claim 1, wherein said second control part enables controlling a time to change between different characteristics.

9. A method, comprising:
using a lighting console to define a gobo type having editable parameters;
selecting two different parameter values; and
defining a time for said gobo type to change its appearance between said two different parameter values.

10. A method as in claim 9, wherein said editable parameters include a thickness of a gobo part.

11. A method as in claim 9, wherein said editable parameters include a diameter of a gobo part.

12. A method as in claim 9, wherein said gobo type is a composite gobo with moving parts, and said parameter values define paths for the respective moving parts.

13. A method, comprising:
using a lighting console to define first and second lighting objects collectively forming a composite gobo; and
defining movement information as part of gobo data; and
forming the gobo using said objects and said movement information.

14. A method as in claim 13, wherein said forming comprises producing a signal and applying said signal to an electrically controllable light pattern generator to form the gobo.

15. A method as in claim 13, further comprising using the lighting console to define timing information for the first and second objects.

16. A method as in claim 13, wherein said forming comprises forming a single record which defines said objects and said movement information.

17. A method, comprising:
selecting a gobo from a library of different electronic gobos; and
characterizing said gobo according to a number of moving parts within the gobo.

18. A method as in claim 17, further comprising outputting data according to a type assignment which includes a code indicative of said number of moving parts.

19. A method as in claim 18, wherein said type assignment includes a first type assignment with no moving parts, a second type assignment with one moving part, and a third type assignment with more than one moving part.

20. A method as in claim 17, further comprising, for a gobo with at least one moving part, selecting a time for response for said gobo moving part.

21. A method, comprising:
defining a gobo type in a lighting console, and sending an identification signal indicative of said gobo type from said lighting console to an electronically controlled light which is remote from said lighting console; and
using said identification signal to search a library within said electronically controlled light for a matching gobo image and to use said matching gobo image to shape an output light from said electronically controlled light.

22. A method as in claim 21, wherein said using comprises receiving a gobo control signal in said electronically controlled light, and using only some of a plurality of bits of said electronically controlled signal to search for a matching gobo image.

23. A method as in claim 21, wherein said using comprises copying a matching gobo image from said library to a random access memory within said electronically controlled light.

24. A method as in claim 23, further comprising forming modification information for said gobo type in said lighting console, and using said modification information to modify said gobo image in said random access memory.

25. A method as in claim 24, further comprising using said gobo image in said random access memory to draw an image on the display device.

26. A method as in claim 24, wherein said display device is an electronically alterable, pixel-selectable digital mirror device.

27. A method as in claim 24, further comprising obtaining new modification information, and using said new modification information to modify said gobo image in said random access memory.

28. A method as in claim 27, further comprising using said gobo image in said random access memory to draw an image on the display device which is periodically retraced, and calculating new values at each time of retrace.

29. A method as in claim 24, further comprising obtaining new modification information, forming a new image using said new modification information, and slewing from said existing gobo image to a new gobo image represented by said new modification information.

30. A method, comprising:
defining gobo information using an electronic gobo controller element to select a specified gobo type and parameters associated with said gobo type;
forming a gobo shape of a default size of said specified gobo type; and
modifying said specified gobo type according to set parameters.

31. A method as in claim 30, wherein said default size gobo shape is formed at the specified position.

32. A method as in claim 30, further comprising enabling said default size gobo to be replicated.

33. A method, comprising:
defining multiple shapes which collectively define the gobo to be used in displaying an image;
setting priorities for the multiple shapes; and
displaying the multiple shapes according to the priorities.

34. A method as in claim 33, wherein said displaying comprises always displaying a highest priority shape at an intersection between said highest priority shape and a lower priority shape.

* * * * *